United States Patent [19]

Yokoyama

[11] 4,321,662

[45] Mar. 23, 1982

[54] POWER SUPPLY CIRCUIT FOR ELECTRICAL APPARATUS

[75] Inventor: Kenji Yokoyama, Hamamatsu, Japan

[73] Assignee: Nippon Gakki Seizo Kabushiki Kaisha, Hamamatsu, Japan

[21] Appl. No.: 129,642

[22] Filed: Mar. 12, 1980

[30] Foreign Application Priority Data

Jun. 29, 1979 [JP] Japan .................................. 54-82485
Dec. 12, 1979 [JP] Japan ........................... 54-171827[U]

[51] Int. Cl.³ ............................................ H02P 13/24
[52] U.S. Cl. ...................................... 363/86; 323/217; 323/237
[58] Field of Search ...................... 307/252 B; 363/86; 323/217, 237, 271, 282, 351

[56] References Cited

U.S. PATENT DOCUMENTS 3,466,527 9/1969 Sun Chun .
3,506,905 4/1970 Thomas .
3,541,421 11/1970 Buchman .......................... 363/86 X
3,723,849 3/1973 Ludloff .
4,051,425 9/1977 Smith .................................. 363/86

FOREIGN PATENT DOCUMENTS

50-141743 11/1975 Japan .

Primary Examiner—William M. Shoop
Attorney, Agent, or Firm—Cushman, Darby & Cushman

[57] ABSTRACT

In a power supply circuit for an electrical apparatus, comprising a power transformer having its secondary winding connected to a smoothing capacitor via a rectifying circuit and having its primary winding adapted to be applied with an ac voltage, a switching means is provided for applying the ac voltage to the primary winding only for a selected period of time in a half cycle of this ac voltage and for terminating the application of this ac voltage before an arrival of a zero crossing point of the ac voltage, whereby allowing a voltage of a time length corresponding to a current flowing through the secondary winding to be applied to the primary winding of the transformer, to thereby inhibit a flow of unnecessary exciting current to the primary side. This power supply circuit also contributes to stabilization of the dc output voltage of the power supply circuit.

9 Claims, 12 Drawing Figures

POWER SUPPLY CIRCUIT FOR ELECTRICAL APPARATUS

BACKGROUND OF THE INVENTION (a) Field of the invention:

The present invention concerns a power supply circuit for an electrical apparatus, more particularly for an audio power amplifier.

Figure 1:
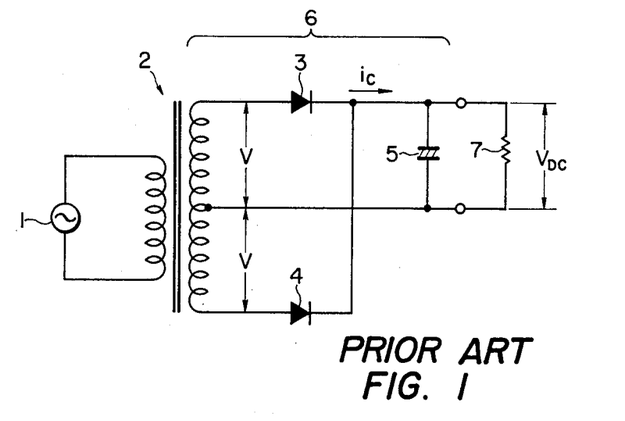
FIG. 1 is a circuit diagram of a known power supply circuit.

(b) Description of the prior art:

Power supply circuits intended for deriving dc output from commercial ac power supply for use in amplifiers and like devices, in general, employ a power transformer for set-up or down of the ac power supply voltage or for isolation between commercial ac power supply source and the dc output. For example, FIG. 1 is an illustration showing the circuit arrangement of a conventional power supply circuit. Such circuit diagram has the configuration to enable that the voltage of the ac power supply 1 is set up or down by a transformer 2, and that the voltage of the output of this transformer 2 is subjected to rectification-and-smoothing by a rectifying and smoothing circuit 6 which is composed of diodes 3 and 4 and a capacitor 5, and that the output of this rectifying and smoothing circuit 6 is supplied to a load 7.

Figure 2:
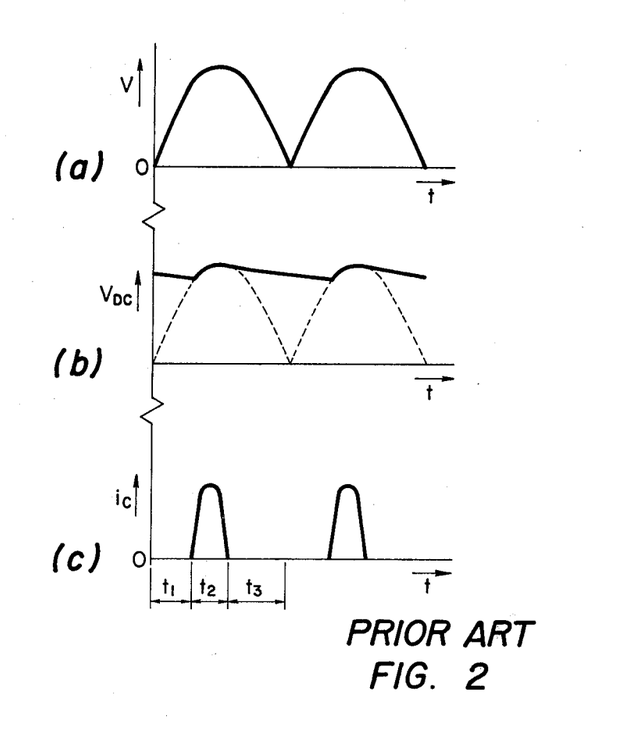
FIG. 2 is a diagram showing the waveshapes of voltages and current at some portions in the power supply circuit of FIG. 1.

In such known power supply circuit, however, an attempt to obtain a large capacity output has tended to an undesirable increase in the size, configuration and weight of the power transformer which is employed. This is because of the fact that an increase in the output, i.e. an increase in the load current, necessitates a power transformer having windings of a diameter large enough to sufficiently sustain such large current flow. Also, in the known power supply circuit described above, the voltage V derived across the secondary winding of the transformer 2, i.e. the rectified and smoothed voltage in the rectifying and smoothing circuit 6, the output voltage $V_{DC}$ which is supplied to the load 7, and the charging current $i_c$ for the capacitor 5 assume their waveshapes as those shown at (a), (b) and (c) in FIG. 2, respectively. As will be understood from these illustrations, this known power supply circuit is such that the period of time required for the transmission of power supply in the transformer 2 is limited to only that period of time $t_2$ of flow of the charging current with respect to a half cycle of the voltage V. In other words, for those periods of time $t_1$ and $t_3$, there are allowed to flow only exciting currents. Thus, the known power supply circuit has another disadvantage that the transformer 2 has periods of time wherein only the exciting currents are allowed to flow and that these exciting currents are wasteful.

Figure 3:
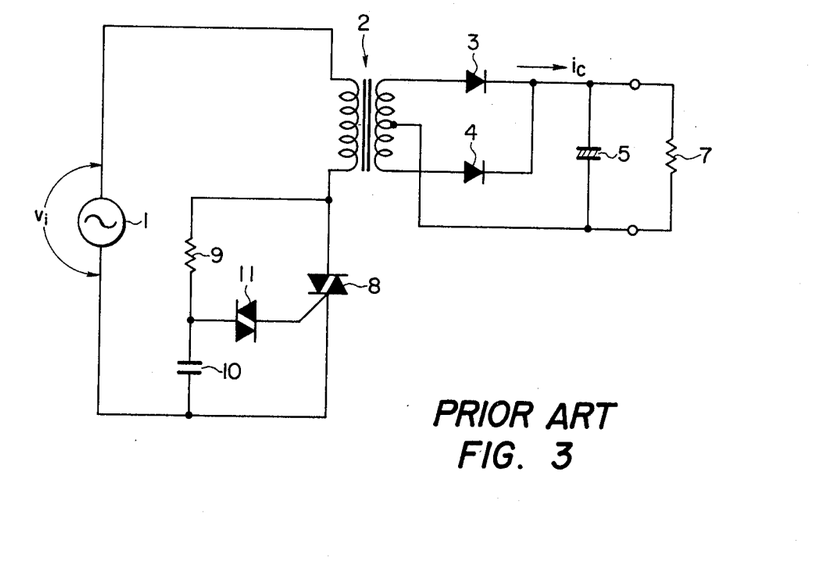
FIG. 3 is a circuit diagram of another known power supply circuit of the phase-controlling type.

Also, apart from the conventional power supply circuit discussed above, there has been proposed and placed on markets a power supply circuit of another type which is arranged so as to control the power which is to be supplied to a load, by the use of a bidirectional thyristor such as Triac (a trademark of a product of General Electric, Inc. of U.S.A.), as shown in FIG. 3. The power supply circuit shown in FIG. 3 is of the arrangement that, in the power supply circuit arrangement shown in FIG. 1 designed so that the voltage of the ac power supply 1 is supplied to the primary coil of the power transformer 2, and that the voltage derived at the secondary coil of this transformer 2 is rectified and smoothed by diodes 3 and 4 and a capacitor 5 for being supplied to a load 7, there is inserted a bidirectional thyristor 8 between the ac power supply 1 and the primary coil of the transformer 2, and that this bidirectional thyristor 8 is triggered by a trigger circuit which, in turn, is comprised of triggering elements such as a resistor 9, a capacitor 10 and a diac 11. This another type power supply circuit is operative so that, by appropriately setting the values of the resistor 9 and the capacitor 10, and also by controlling the firing angle of the bidirectional thyristor 8, the amount of power supply which is to be provided to the load 7 is determined.

Figure 4:
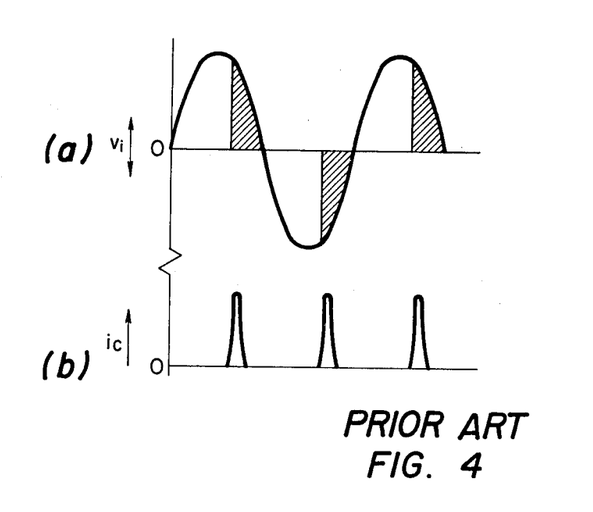
FIG. 4 is a diagram showing the waveshapes of voltage and current at some portions in the power supply circuit of FIG. 3.

However, this latter power supply circuit also is not free of the inconvenience that, when the bidirectional thyristor 8 is turned "on" and when, thus, a power is supplied from the secondary coil of the transformer 2 to the load 7 side, there is easily allowed a large exciting current to flow to the primary coil of the transformer 2 after the current $i_c$ flowing to the load 7 side has become zero. More particularly, in case the voltage which is applied to the primary side of the transformer 2 of this known power supply circuit is assumed to be that part of voltage shown in the hatched portion of the voltage $V_i$ of the ac power supply 1 at (a) of FIG. 4, the current $i_c$ which is allowed to flow to the load 7 side will become such momentary current as shown at (b) of FIG. 4. Thus, even after this current $i_c$ has dropped to zero, there easily flows to the primary side of the transformer 2 an exciting current of a large amount and having a delay in phase by 90 degrees. Accordingly, in such power supply circuit, there are needed such countermeasures as increasing the density of the magnetic flux of the core and/or increasing the number of turns of the windings of the transformer. Each of these countermeasures to be taken is entailed by an increase in the size and weight of the power transformer, and also by the use of windings of a large diameter from the viewpoint of preventing of burning caused by such large exciting current flow. Thus, in this case, too, the power supply transformer tends to have, undesirably, a further enlarged size and increased weight.

As the related techniques of the prior art in this field of art, it is also known to stabilize the output voltage of power supply circuit shown in FIG. 3 by using feedback technique. This technique has been disclosed in, for example, U.S. Pat. No. 4,051,425, Japanese Layingopen Utility Model Application No. 50-141743, U.S. Pat. No. 3,466,527, U.S. Pat. No. 3,723,849 and U.S. Pat. No. 3,506,905. These prior techniques, however, invariably have the inconveniences and disadvantages similar to those discussed above.

SUMMARY OF THE INVENTION

It is, therefore, a primary object of the present invention to provide a power supply circuit for electrical apparatus, arranged to inhibit the flow of unnecessary exciting current to a power transformer, and to reduce the size and weight of the transformer, and also to reduce damage due to the flow of exciting current in the transformer, to thereby enhance the efficiency of the power supply circuit.

It is another object of the present invention to provide a power supply circuit of the type described above, in which the above-mentioned object is materialized by the arrangement that, during a predetermined period in a half cycle of ac input voltage, the ac input voltage is applied to the primary winding side of the transformer by a switching means and that the termination of said predetermined period in a half cycle of the ac voltage can be set to occur before the zero crossing point of the ac voltage applied.

Still another object of the present invention is to provide a power supply circuit of the type described above, in which, arrangement is provided so that the switching timing of the switching means assigned for applying an ac input voltage to the primary winding side of the transformer only for a predetermined period in a half cycle of the ac input voltage is controlled in accordance with a dc output voltage, to thereby stabilize this output voltage.

BRIEF DESCRIPTION OF THE DRAWINGS

Like parts are represented by like reference symbols and numerals throughout the drawings.

DETAILED DESCRIPTION OF THE PREFERRED EMBODIMENTS

Figure 5:
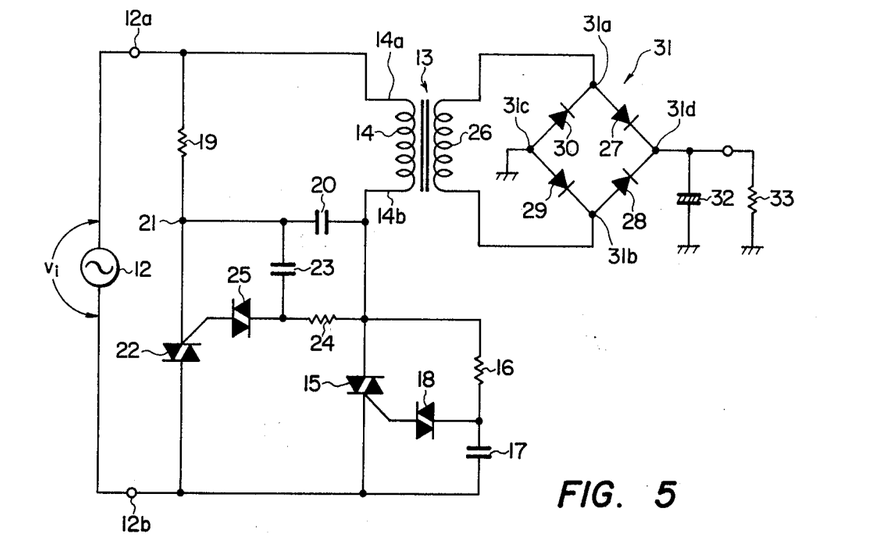
FIG. 5 is a circuit diagram of a power supply circuit representing an embodiment of the present invention.

The present invention will hereunder be described in further detail with respect to some preferred embodiments by referring to FIG. 5 and subsequent Figures, all of which are given just by way of example.

FIG. 5 is a circuit diagram showing an embodiment of the power supply circuit of the present invention. In FIG. 5, reference numeral 12 represents an alternate current supply, and numerals 12a and 12b represent terminals thereof. One 12a of these terminals of the ac supply 12 is connected to one 14a of the terminals of a primary winding 14 of a power transformer 13, and the other 12b of the terminals of the power supply 12 is connected to the other 14b of the terminals of the primary winding 14 via a bidirectional main thyristor 15. Between the terminal 14b and the power supply terminal 12b, i.e. between the two terminals of the bidirectional main thyristor 15, are inserted, in series, a resistor 16 and a capacitor 17. The connecting point of the resistor 16 and the capacitor 17, in turn, is connected to the gate of said bidirectional main thyristor 15 via a bidirectional triggering element 18 such as a diac. Said resistor 16, said capacitor 17 and said triggering element 18 jointly constitute a trigger circuit of the bidirectional main thyristor 15. Furthermore, between the two terminals 14a and 14b of the primary winding 14 are inserted, in series, a resistor 19 and a capacitor 20. The connecting point 21 of the resistor 19 and the capacitor 20 is connected, via a bidirectional auxiliary thyristor 22, to the power supply terminal 12b. Also, between the aforesaid connecting point 21 and the terminal 14b of the primary winding 14 are connected, in series, a capacitor 23 and a resistor 24. The connecting point of these capacitor 23 and resistor 24, in turn, is connected, via a triggering element 25 such as a diac, to the gate of the bidirectional auxiliary thyristor 22. Also, a secondary winding 26 of the power transformer 13 is connected to input terminals 31a and 31b of a full-wave rectifier circuit 31 which is formed by a bridge connection of diodes 27 to 30. Between the two output terminals 31c anc 31d of said full-wave bridge rectifier circuit 31 is connected a smoothing capacitor 32, and furthermore a load 33.

Next, description will be made of the operation of the power supply circuit having the foregoing structure.

To begin with, the bidirectional main thyristor 15 and the bidirectional auxiliary thyristor 22 in the power supply circuit described above are in their "off" state when the voltage across the power supply terminals 12a and 12b is zero (0 volt). When the voltage of the power supply terminal 12a relative to the terminal 12b begins to rise gradually in, for example, the positive half cycle, such progressively rising voltage is applied to the capacitor 17 through the primary winding 14 of the power transformer 13 and the resistor 16, charging up this capacitor 17 with a time constant which is determined by $R_{16} \cdot C_{17}$, wherein $R_{16}$ represents the value of the resistor 16, and $C_{17}$ represents the value of the capacitor 17. In view of the fact that the voltage across the terminals 14a and 14b of the primary winding 14 is zero (0 volt) at such time, both capacitors 20 and 23 are in their discharged state. Accordingly, because the triggering element 25 is in its "off" state at such time, the bidirectional auxiliary thyristor 22 remains to be in its 37 off" state.

When the voltage across the capacitor 17 exceeds beyond a certain level, the triggering element 18 is turned "on" so that the electric charge of the capacitor 17 is allowed to flow to the gate of the bidirectional main thyristor 15 to thereby turn this thyristor 15 "on". And, at the time that this bidirectional main thyristor 15 turns "on", the voltage across the power supply terminals 12a and 12b is applied to the primary winding 14. Whereupon, this voltage is supplied, via the resistor 19, to the capacitor 20, and concurrently therewith, it is supplied, via the resistors 19 and 24, to the capacitor 23, so that these capacitors 20 and 23 are charged up. When, thus, the voltage across the capacitor 23 exceeds beyond a certain value, the triggering element 25 is turned "on", so that the electric charge of the capacitor 23 is caused to flow to the gate of the bidirectional auxiliary thyristor 22 to thereby turn this thyristor 22 "on". As a result, the electric charge which till then has been stored in the capacitor 20 is discharged, via the bidirectional auxiliary thyristor 22, to the power supply terminal 12b side, thereby applying a reverse bias to the bidirectional main thyristor 15.

More particularly, from the above-described part of operation, the state in which the capacitor 200 is charged up is such that the connecting point 21 side of the capacitor 20 is rendered to a positive polarity, and the terminal 14b side of this capacitor 20 is rendered to a negative polarity. Accordingly, the electric charge of the capacitor 20 is discharged so as to reverse-bias the bidirectional main thyristor 15 due to the turning-on of the bidirectional auxiliary thyristor 22. As a result, the bidirectional main thyristor 15 is caused to be turned "off" due to the aforesaid reverse biasing, thereby cutting off the electric path between the power supply terminals 12a, 12b and the primary winding 14. It should be understood that the timing of said cutting off action is set to occur after the flow of current through the secondary winding side of the transformer has dropped to nil. Also, after the bidirectional main thyristor 15 has turned "off", the bidirectional auxiliary thyristor 22 also turns "off" because the next negative half cycle of the voltage is applied so that the bidirectional auxiliary thyristor 22 is reverse-biased at the moment the next negative half cycle is started to be applied. In this way, in the positive half cycle of the voltage, a voltage across the power supply terminals 12a and 12b is applied to the primary winding 14 of the power transformer 13 only for that certain period of time during which the bidirectional main thyristor 15 is rendered "on". This operation is carried out in a similar manner during the negative half cycle of the voltage also.

Figure 6:
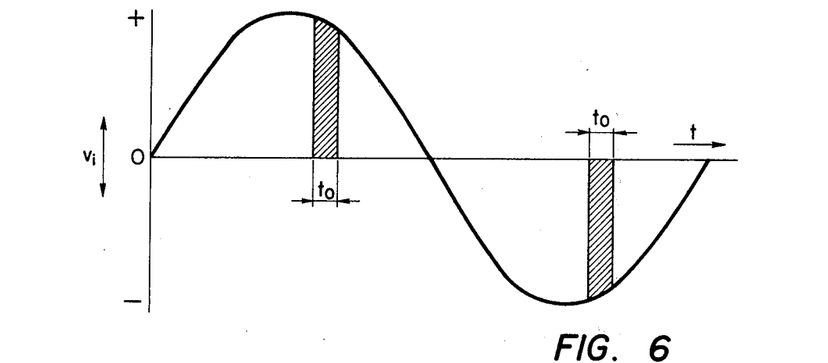
FIG. 6 is a diagram showing a voltage waveshape on the primary winding side of a power transformer employed in the power supply circuit of FIG. 5.

From the foregoing description, it will be understood that, in this embodiment of the power supply circuit, there is applied to the primary winding 14 of the power transformer 13 a voltage of such extent as shown by hatched portions in FIG. 6, in case the voltage $V_i$ across the power supply terminals 12a and 12b is as shown in FIG. 6. More particularly, the period of time during which the voltage $V_i$ is kept applied to the primary winding 14 is the period that the bidirectional main thyristor 15 remains to be turned "on", i.e. the respective period $t_o$, $t_o$, ... shown in FIG. 6. Thus, there is induced in the secondary winding 26 of the power transformer 13 a voltage in correspondence with the voltage applied to the primary winding 14 of this transformer. This voltage induced in the secondary winding 26 is rectified by the full-wave rectifying circuit 31, and thereafter it is smoothed by the capacitor 32, and then it is supplied to the load 33. It should be understood that, during this operation, the current flowing through the secondary winding 26, i.e. the charge-up current for the capacitor 32, is a momentary current, and that such momentary current is one which can be managed by the voltage of short period which is applied to the primary winding 14 of the transformer 13.

As such, in the power supply circuit described above, it is possible to arbitrarily set the turning-on and turning-off periods of time of the bidirectional main thyristor 15, i.e. the length of time that a voltage is being applied to the primary winding 14 of the power transformer 13, by appropriately setting the values of the capacitors 17, 23 and the resistors 16, 24. Accordingly, by the adoption of this power supply circuit, it is possible to apply a voltage to the primary winding 14 of the power transformer 13 in accordance with the period of time during which a current is allowed to flow to the load 33 side. Therefore, the power supply circuit described above has the advantages that the transmission of power from the ac power supply 12 to the load 33 side can be performed with a high efficiency, and that, at the time of designing the power transformer 13, the maximum magnetic flux density of the transformer core can be reduced, and also that there is no need of increasing the number of turns of windings beyond a required number, and that accordingly the power transformer 13 can be made into a compact size and a light weight. In addition, there is the further advantage that, in view of the fact that no unnecessary exciting current is allowed to flow, the danger of damage due to such flow of exciting current can be greatly reduced.

Figure 7:
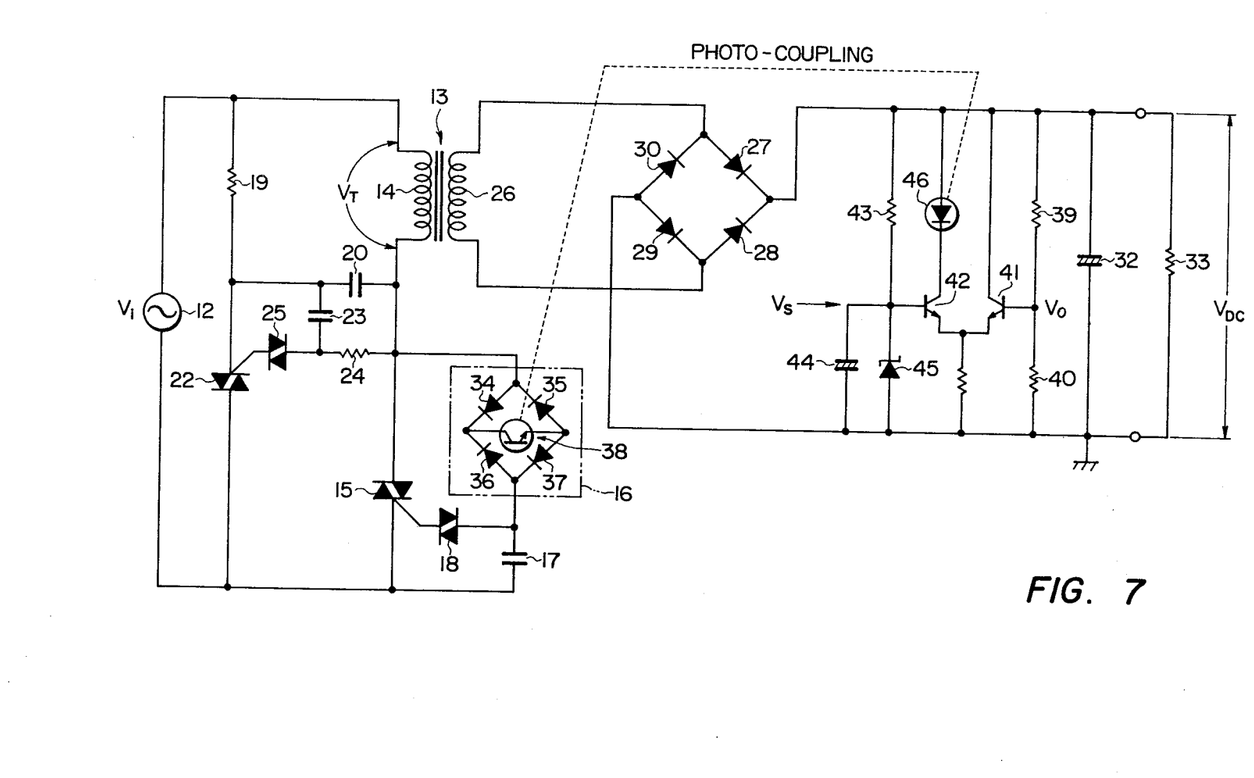
FIG. 7 is a circuit diagram of a stabilized power supply circuit, representing an embodiment in case the circuit of FIG. 5 of the present invention is applied to stabilizing power supply purpose.

FIG. 7 shows a circuit diagram showing an instance wherein the power supply circuit shown in FIG. 5 is applied to a stabilized power supply. It should be understood that those parts similar to those shown in FIG. 5 are represented by like reference symbols and numerals to omit their description. In the circuit arrangement shown in FIG. 7, the resistor 16 of the triggering circuit of FIG. 5 is composed of a bridge rectifier circuit formed with diodes 34 to 37 and also of a phototransistor 38 which is to serve as a load of said rectifier circuit, to be operative so that the firing phase of the bidirectional main thyristor 15 is varied by the variation of the internal resistance of said phototransistor 38. Moreover, arrangement is provided so that an output voltage $V_{DC}$ which is applied to a load 33 such as an audio power amplifier is detected after dividing this voltage by resistors 39 and 40 and the detected voltage $V_o$ is applied to the base of one 41 of the two transistors in a differential amplifier circuit which is composed of the transistor 41 and another transistor 42, whereas to the other 42 of these transistors is provided a constant reference voltage $V_s$ by a resistor 43, a capacitor 44 and a Zener diode 45, and that on the basis of the difference between the detected voltage $V_o$ and the reference voltage $V_s$, a photodiode 46 which is a load of the differential amplifier circuit is lighted up, and further that the internal resistance of the aforesaid phototransistor 38 is varied by the light emitting from the photodiode 46. It should be understood that said phototransistor 38 and said photodiode 46 are used in the form of photocoupler.

Figure 8:
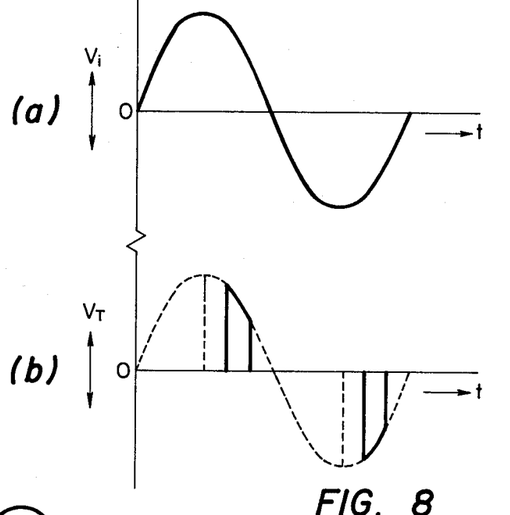
FIG. 8 is a diagram showing the waveshapes of voltages at some portions of the stabilized power supply of FIG. 7.

The operation of the power supply circuit shown in FIG. 7 is as follows. An elevation of the output voltage $V_{DC}$ causes an elevation of the detected voltage $V_o$, causing a drop of the collector voltage of one 41 of the transistors, which drop, in turn, causes an elevation of the collector voltage of the other 42 of the transistors, thus reducing the collector current thereof, resulting in a decrease in the brightness of the light of the photodiode 46. This decrease in the brightness of light causes the internal resistance of the phototransistor 38 to increase, causing the bidirectional main thyristor 15 to be controlled in such way that its firing phase is delayed. Whereby, the output voltage of the power transformer 13 drops, and along therewith the output voltage $V_{DC}$ for the load 33 also drops, thus suppressing the tendency of increase in this output voltage $V_{DC}$. Conversely, in case the output voltage $V_{DC}$ drops, the bidirectional main thyristor 15 is controlled in the reverse way. More specifically, in the power supply circuit shown in FIG. 7, the current flowing to the transistor 42 is varied in its amount in inverse proportion to the variation of the output voltage $V_{DC}$. The amount of the resulting brightness of the photodiode 46 brings forth a variation of the internal resistance of the phototransistor 38. Therefore, after all, an elevation of the output voltage $V_{DC}$ causes a lag of the triggering phase of the bidirectional main thyristor 15. Accordingly, the voltage $V_T$ which is applied to the primary winding 14 of the power transformer 13 will be a voltage having a smaller maximum value. Whereas, a drop of the output voltage $V_{DC}$ will cause the triggering phase of the bidirectional main thyristor 15 to advance, so that a voltage $V_T$ having a larger maximum value will be applied to the primary winding 14 of the power transformer 13. It should be understood that (a) of FIG. 8 shows an input voltage $V_i$, and (b) of FIG. 8 shows a voltage $V_T$ which is applied to the primary winding 14. This voltage $V_T$ is controlled of its phase in each 90 degrees in the respective ranges of 90 to 180 degrees, and 270 to 360 degrees, and thus the output voltage $V_{DC}$ is held constant.

Figure 9:
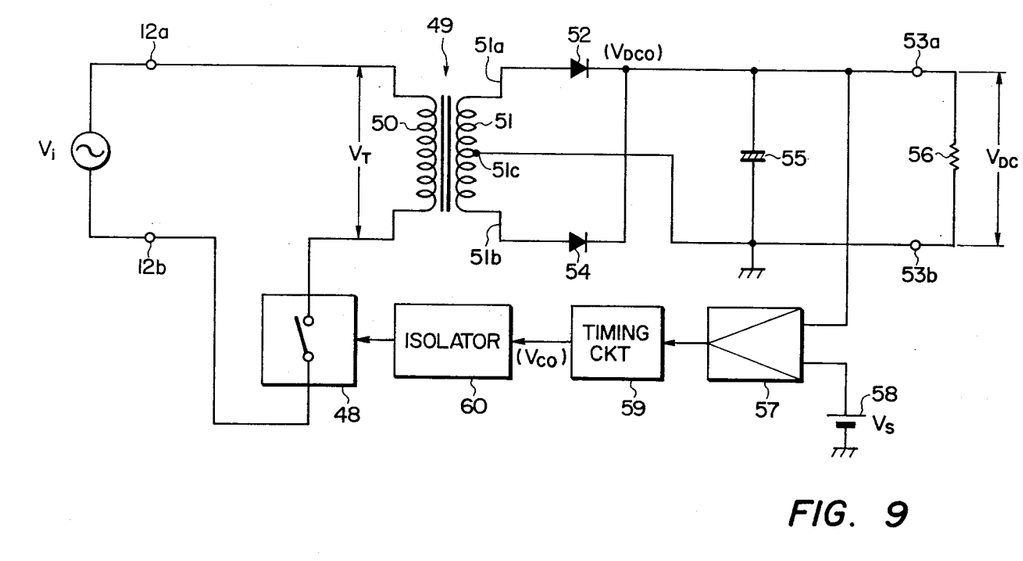
FIG. 9 is a diagram, partly presented in block form, of a more concrete use of a stabilized power supply circuit, representing another embodiment of the present invention.

FIG. 9 is a circuit diagram, partly in block form, showing an instance wherein the power supply circuit of the present invention is applied to a more concrete use, i.e. in case it is applied to a stabilized power supply. This embodiment represents an instance wherein phase control is carried out within each 90 degrees of from 0 to 90 degrees and from 180 to 270 degrees of the power supply voltage.

In the circuit diagram of FIG. 9, a switching circuit 48 is intended to perform switching, with a timing as will be described later, of an ac power supply voltage which is applied from across the input terminals 12a and 12b to the primary winding 50 of a power transformer 49. This switching circuit 48 may be formed with a transistor, a unidirectional thyristor, a bidirectional thyristor or like elements. Also, one terminal 51a of the secondary winding 51 of the power transformer 49 is connected, via a diode 52, to an output terminal 53a of the circuit, and the other terminal 51b is connected, via a diode 54, to the output terminal 53a, and the mid point 51c of the secondary winding 51 is connected to the other output terminal 53b and is grounded. Between the respective output terminals of the diodes 52 and 54, i.e. the output terminal 53a, and the mid point 51c is inserted a capacitor 55. Also, between the respective output terminals 53a and 53b is connected a load 56 such as an audio power amplifier.

In the power supply circuit having the aforesaid arrangement, it should be understood that the diodes 52, 54 and the capacitor 55 jointly constitute a rectifying and smoothing circuit for rectifying and smoothing the voltage derived across the secondary winding 51 and for supplying the resulting voltage to the respective output terminals 53a and 53b. Also, the output voltage $V_{DC}$ which is derived across the output terminals 53a and 53b is adapted to be supplied to a differential amplifier 57. This differential amplifier 57 is so constructed as to output a comparison voltage between an output voltage $V_{DC}$ and a reference voltage $V_s$ which is supplied from a reference voltage supply 58. This differential amplifier 57 is, thus, adapted to supply said comparison voltage signal to a timing circuit (control circuit) 59. This timing circuit 59 is intended to control the on-off timing of said switching circuit 48 based on said comparison voltage which is supplied from said differential amplifier 57. This timing circuit 59 is operative so that it supplies, via an isolator 60 which is formed with a photocoupler, a transistor and like elements, to the switching circuit 48 a pulse signal $V_{CO}$ whose phase is determined on the basis of said comparison voltage.

Figure 10:
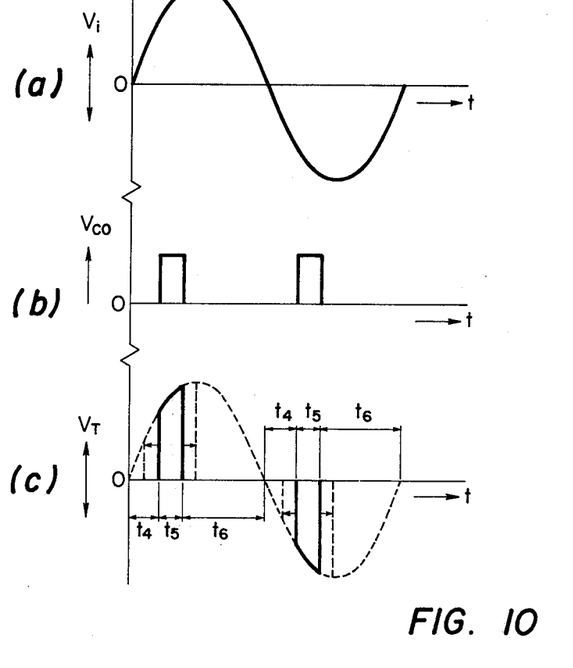
FIG. 10 is a diagram showing the waveshapes of voltages at various portions of the circuit shown in FIG. 9.

In this case, the waveshape of the pulse signal $V_{CO}$ for the input voltage $V_i$ is as shown in FIG. 10. More particularly, the pulse signal $V_{CO}$ is such that, as shown at (b) of FIG. 10, its pulse width is constant and its cycle is in agreement with the half cycle of the input voltage $V_i$, as shown at (a) of FIG. 10. This pulse signal is adapted to be controlled of its phase relative to the input voltage $V_i$ within the extent of 90 degrees based on the aforesaid comparison voltage. The switching circuit 48 which receives this control signal $V_{CO}$ is adapted to make when the control signal $V_{CO}$ is in a high level, and to break when the signal is in a low level. Also, the waveshape of the voltage $V_T$ which is applied to the primary winding 50 via the switching circuit 48 is as shown at (c) of FIG. 10. More particularly, this voltage $V_T$ is such pulse-like voltage which is constant during the period of time $t_5$ corresponding to said pulse signal $V_{CO}$. Said voltage $V_T$ is such voltage that its building-up and decaying timings vary within the extent of 90 degrees based on said comparison voltage.

Description will next be directed to the operation of the circuit shown in FIG. 9.

The voltage $V_T$ which is applied to the primary winding 50 of the power transformer 49 is a pulse-like voltage as shown at (c) of FIG. 10, whose phase is controlled by the output voltage $V_{DC}$. More particularly, in case the output voltage $V_{DC}$ is varied by, for example, fluctuation of the load 56 which is connected between the output terminal 53a and the output terminal 53b, this variation is detected by the differential amplifier 57, and a voltage corresponding to this variation is supplied to the timing circuit 59. This timing circuit 59, in turn, delivers a pulse signal $V_{CO}$ with a phase based on said voltage, which pulse signal is supplied, via the isolator 60, to the switching circuit 48. The switching circuit 48 switches the input voltage $V_i$ based on the pulse signal $V_{CO}$. And, the voltage $V_T$ which is applied to the primary winding 50, in its waveshape shown at (c) of FIG. 10, is controlled of its time interval $t_5$, i.e. of its build-up and decay, on the basis of the output voltage $V_{DC}$. In such case, the voltage $V_T$ is controlled, in case of a heavy load, i.e. in case the output voltage $V_{DC}$ is lower than a rated voltage, in such way that the time interval $t_4$ becomes greater, i.e. the time interval $t_6$ becomes smaller. Whereas, in case of a light load, i.e. in case the output voltage $V_{DC}$ is higher than the rated voltage, the voltage $V_T$ is controlled in such way that the time interval $t_4$ becomes smaller, i.e. the time interval $t_6$ becomes greater. Thus, the voltage $V_T$ is controlled of its maximum value within the extent of 90 degrees of the phase of the input voltage $V_i$. As a result, there is induced, on the secondary winding side of the power transformer 49, a pulse-like voltage whose maximum value is controlled. This induced voltage is subjected to rectification and smoothing, and is supplied across the output terminals 53a and 53b. As such, there is derived, across the output terminals 53a and 53b, a constant output voltage $V_{DC}$ which is not influenced by fluctuations of the load current.

Figure 11:
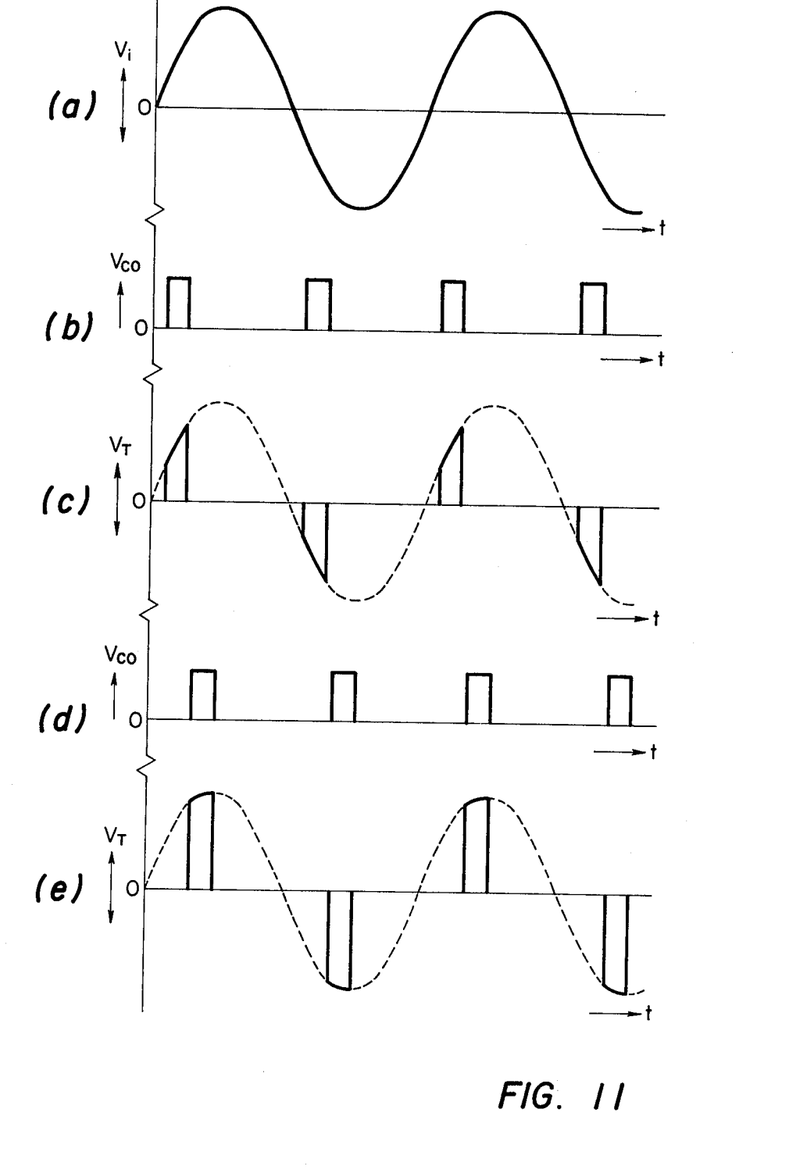
FIG. 11 is a diagram showing the waveshapes of voltages at various portions of the circuit of FIG. 9, for the explanation of phase control.
Figure 12:
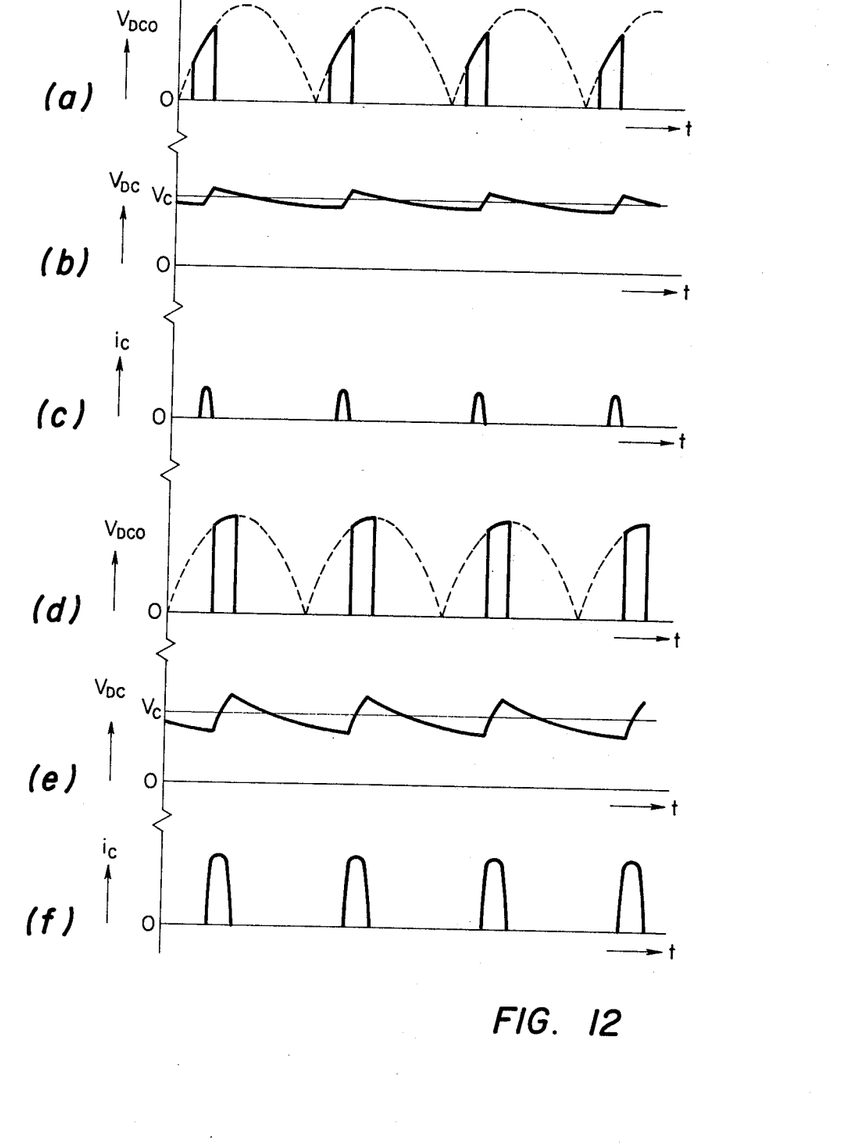
FIG. 12 is a diagram showing the waveshapes of voltages and currents at various portions of the circuit of FIG. 9, for the explanation of stabilization of output voltage.

FIGS. 11 and 12 are diagrams showing the voltage waveshapes derived at various portions of the circuit during the aforesaid operation. In these Figures, (a) of FIG. 11 is a diagram showing the waveshape of an input voltage $V_i$. A pulse signal $V_{CO}$, in case the load is lighter relative to this input voltage $V_i$, will have such waveshape as shown at (b) of FIG. 11. The voltage $V_T$ in such case will assume such waveshape as shown at (c) of FIG. 11. Also, the pulse signal $V_{CO}$ in case of a heavy load will have a waveshape as shown at (d) of FIG. 11. The voltage $V_T$ in such case will have such waveshape as shown at (e) of FIG. 11. Also, in case the voltage $V_T$ assumes such waveshape as shown at (c) of FIG. 11, the rectified voltage $V_{DCO}$ which is obtained through the diodes 52 and 54 will have such waveshape as shown at (a) of FIG. 12. Also, this rectified voltage $V_{DCO}$ after having been smoothed, that is the output voltage $V_{DC}$, will be provided in such waveshape as shown at (b) of FIG. 12. Furthermore, the charging-up current $i_c$ which flows through the capacitor 55 at such time will have such waveshape as shown at (c) of FIG. 12. In case the voltage $V_T$ of the waveshape as shown at (e) of FIG. 11, the rectified voltage $V_{DCO}$ which is derived from the diodes 52 and 54 will have the waveshape as shown at (d) of FIG. 12. Also, the output voltage $V_{DC}$ which is the rectified voltage $V_{DCO}$ after having been smoothed by the capacitor 55 will have the waveshape as shown at (e) of FIG. 12. Also, the charge-up current $i_c$ which flows through the capacitor 55 at such time will assume such waveshape as shown at (f) of FIG. 12. It will thus be understood that the average level of the output voltage $V_{DC}$ is always held constant, irrespective of fluctuations of the load current.

What is claimed is:

1. A power supply circuit for an electrical apparatus, comprising: a power transformer having its primary winding adapted for being applied with an AC voltage, and having its secondary winding connected to a rectifying and smoothing circuit, the improvement wherein said power supply circuit further includes:
   a switching means, connected in series to said primary winding, for applying said AC voltage to said primary winding of said transformer only for a selected period of time in a half cycle of said AC voltage and for terminating this application of AC voltage before an arrival of zero crossing point of said AC voltage;
   said switching means being a circuit comprised of a main thyristor connected in series to said primary winding, a first triggering circuit for triggering said main thyristor, a first capacitor adapted to be charged up as said main thyristor is turned "on" by said first triggering circuit, a second triggering circuit adapted to be actuated after a certain lapse of time as said main thyristor is turned "on", and an auxiliary thyristor adapted to be turned "on" by said second triggering circuit, whereby said first capacitor is discharged of its electric charge as said auxiliary thyristor is turned "on" thereby reversely biasing said main thyristor to turn "off" the main thyristor.

2. A power supply circuit according to claim 1, in which: said first triggering circuit is comprised of a series circuit formed with a second capacitor and a first resistor and connected in parallel to said main thyristor, and a first triggering element connected between a common connecting point of said second capacitor and said first resistor and a gate of said main thyristor.

3. A power supply circuit according to claim 1, in which: said auxiliary thyristor is connected via said first capacitor to said main thyristor, and in which: a series circuit of said first capacitor and a second resistor is connected in parallel to said power transformer.

4. A power supply circuit according to claim 1, in which: said second triggering circuit is comprised of a series circuit formed with a third capacitor and a third resistor and connected in parallel to said first capacitor, and a second triggering element connected between a common connecting point of said third capacitor and said third resistor and a gate of said auxiliary thyristor.

5. A power supply circuit according to claim 1, in which: said first triggering circuit is adapted to set a triggering timing of said main thyristor in accordance with fluctuations of a dc output voltage level of said power supply circuit.

6. A power supply circuit according to claim 5, further comprising a differential amplifier having its one input terminal adapted to be applied with a voltage corresponding to a dc output voltage of said power supply circuit which is to be stabilized and serving as a reference voltage, and having its other input terminal adapted to be applied with a voltage corresponding to said dc output voltage, to thereby detect said fluctuation of the dc output voltage level.

7. A power supply circuit according to claim 1, in which: said main thyristor and said auxiliary thyristor are each unidirectional thyristor.

8. A power supply circuit according to claim 1, in which: said main thyristor and said auxiliary thyristor are each bidirectional thyristor.

9. A power supply circuit according to claim 1, in which: said rectifying and smoothing circuit is comprised of a rectifying circuit having diode means connected across said secondary winding of said power transformer and a smoothing circuit having capacitor means connected to an output of said rectifying circuit.

* * * * *